Patented Jan. 5, 1937

2,066,643

UNITED STATES PATENT OFFICE 2,066,643

NONSAGGING BRUSHING LACQUER

Glenn H. Pickard, Wilmette, Ill., assignor to Commercial Solvents Corporation, Terre Haute, Ind., a corporation of Maryland No Drawing. Application September 14, 1934, Serial No. 744,017

12 Claims. (Cl. 134—79)

My invention relates to new and improved types of cellulose ester brushing lacquers and particularly to lacquers of this type which are to be used as architectural finishes.

Cellulose ester lacquers to be applied by means of brushing differ in a number of respects from other types of coating materials employing cellulose compounds as one of their essential constituents. For example, when applied by brushing the drying period of the lacquer should be sufficiently extended to allow ample time for brushing the lacquer over the section of the surfaces being coated. In addition, the lacquer should remain sufficiently plastic for a short period of time after it has been spread over the surface in order to permit the brush marks or other irregularities to disappear from the film. For most purposes, however, it is undesirable to have this plastic or drying period too long in order that the article being coated may be safely handled or so that additional coats of the lacquer may be applied. Fairly rapid drying of the applied film of coating material when applied to inclined or vertical surfaces has also been desirable in order to prevent the formation of runs or sags which would mar the appearance of final finish.

Aside from the above, a good brushing lacquer should also be of such character as to attach to a minimum degree coatings of paints, varnishes, or cellulose lacquer already on the article being coated. In addition, the lacquer should preferably possess the usual properties of hardness, freedom from cotton or gum blush, etc. The requirements for the formulation of a satisfactory type of brushing lacquer are disclosed in U. S. Patent No. 1,927,539, granted September 19, 1933 to Charles Bogin.

As previously indicated, a desirable type of brushing lacquer is one which does not sag or run when applied on inclined or vertical surfaces. Sagging may be considered to be a viscous flow of the lacquer during the drying period. Ordinarily, if the viscosity of the lacquer is sufficiently reduced sags will develop into runs. This phenomenon is found to take place especially if a thick coat is applied. Since obviously in most cases it is desirable to apply as thick a coating of the lacquer each time as will give a desirable final finish in order to use as few coats as possible, it is apparent that elimination of sagging in brushing lacquers is highly desirable.

Sags and runs in brushing lacquers may be greatly reduced by increasing the plastic resistance to flow of the lacquer. If, however, the plastic resistance to flow is increased to too great an extent, the freshly applied film would not flow sufficiently or rapidly enough to permit the elimination of brush marks or other imperfections before the film dried. It is apparent, therefore, that an ideal brushing lacquer would be one possessing a sufficient plastic resistance to flow so as to prevent sagging and still have sufficient flow so as to allow the brush marks to be eliminated.

Efforts in the past to produce a satisfactory non-sagging brushing lacquer have not in general been successful due to the fact that although the sagging of the lacquer may have been reduced, other highly undesirable features were unfortunately introduced into the lacquer by the means employed. For example, some of the agents used to reduce the plastic flow of the drying film have been found to increase to an undesirable extent the drag on the brush when brushing out the lacquer, so as to increase markedly the labor required to coat a given surface. A further disadvantage in the use of certain of these agents is their tendency to sweat out of the dried film, or to give rise to a highly undesirable haze in the film. Still another disadvantage in the use of certain of the previously suggested anti-sag agents is the fact that they cause a material reduction in the gloss of the lacquer and give a decidedly flatter or duller appearing finish.

I have now discovered that a very satisfactory type of non-sagging cellulose lacquer, possessing to a minimum degree the faults just enumerated, may be obtained by incorporating in the lacquer small amounts of the heavy metal soaps of the acids of tung oil, such as calcium tungate. My invention may be illustrated by the specific examples cited below.

Calcium tungate may be prepared as described in Circular No. 120 of the Paint and Varnish Manufacturers' Association of the United States. According to this procedure 300 grams of tung oil and 43 grams of sodium hydroxide are dissolved in 500 c. c. water and the resulting mixture boiled until saponification is complete, approximately 500 c. c. additional water then being added and the temperature reduced to 50° C. At this point 77 grams of $CaCl_2.2H_2O$ dissolved in 480 c. c. of water at a temperature of 38° C. is added to the soap while stirring vigorously. The resulting material is then filtered through cheese cloth, washed with water, and finally dried.

The calcium tungate is introduced into the lacquer, preferably by grinding in the usual manner with the cellulose ester, pigment, etc., in an amount ranging from approximately 2% to approximately 7% on the weight of the film forming material, depending upon the character of the particular lacquer. After the addition of suitable solvent and thinner, the lacquer is ready for use.

The proper amount of calcium tungate to be used in a particular lacquer may be readily estimated by the following procedure: Several lacquers are made up varying only in their calcium tungate content. The comparative anti-sag properties of these lacquers are then determined by brushing 7 c. c. quantities of each lacquer on duplicate 8"×12" glass panels which are maintained in a vertical position. This quantity of lacquer, taking into consideration the amount retained by the brush, approximates the coating usually applied to vertical architectural surfaces. The lacquer is brushed on the panels by means of a one inch brush, the material being brushed out first with horizontal strokes and subsequently with vertical strokes. Fine wavy horizontal lines are then brushed on the wet surface and the panels are then allowed to dry in a vertical position. The degree of anti-sag imparted to the lacquer is determined by observing the sharpness of the flow marks in the dried film, particularly at the point of the wavy lines previously referred to. The application of this procedure will be illustrated by the following test of the lacquer referred to below as Example I, utilizing amounts of calcium tungate varying from 2 to 6 grams per 100 c. c. of original solvent mixture. The per cent of anti-sag produced was estimated by the degree of sharpness of flow marks varying between those of a lacquer containing no anti-sag agent and those in which no plastic flow occurred. The results obtained are shown in the table below:

Table

| Calcium tungate grams per 100 c. c. solvent mixture | Percent anti-sag produced |
|---|---|
| 2 | 85 |
| 4 | 97 |
| 6 | 100 |

The following examples will illustrate the use of calcium tungate as an anti-sag agent in different types of standard lacquers:

Example I

| | |
|---|---|
| Nitrocellulose (half second) grams | 7 |
| Modified glyptal resin (rezyl resin #19) do | 15 |
| Modified glyptal plasticizer (balsam No. 53) grams (dry wt.) | 12 |
| Titanium dioxide grams | 45 |
| Calcium tungate do | 4 |
| Butyl lactate c. c. | 50 |
| Stoddard solvent naphtha c. c. | 50 |
| Toluol (from plasticizer soln.) c. c. | 3.5 |

Example II

| | |
|---|---|
| Nitrocellulose (half second) grams | 12 |
| Dammar gum (dewaxed) grams (dry wt.) | 12 |
| Dibutyl phthalate grams | 11 |
| Titanium dioxide do | 45 |
| Calcium tungate do | 4 |
| Butyl lactate c. c. | 50 |
| Stoddard solvent naphtha c. c. | 50 |
| Ethyl alcohol (from dammar solution) c. c. | 3.5 |

Example III

| | |
|---|---|
| Nitrocellulose (half second) grams | 10 |
| Dammar gum (dewaxed) grams (dry wt.) | 10 |
| Modified glyptal plasticizer (balsam No. 53) grams (dry wt.) | 16 |
| Titanium dioxide grams | 45 |
| Calcium tungate do | 4 |
| Butyl lactate c. c. | 50 |
| Stoddard solvent naphtha c. c. | 50 |
| Toluol (from plasticizer soln.) c. c. | 4.7 |
| Ethyl alcohol (from dammar soln.) c. c. | 2.9 |

Example IV

| | |
|---|---|
| Nitrocellulose (half second) grams | 12 |
| Ester gum do | 12 |
| Tricresyl phosphate do | 11 |
| Titanium dioxide do | 45 |
| Calcium tungate do | 4 |
| Butyl lactate c. c. | 50 |
| Stoddard solvent naphtha c. c. | 50 |

All of the above lacquers should be diluted to a suitable brushing consistency before application. About 60 c. c. of diluent composed preferably of equal parts of butyl lactate and Stoddard solvent naphtha will usually be found to be satisfactory for the quantities of these examples.

The amounts of calcium tungate employed may be varied depending upon the type of the lacquer. In general, from 2% to 7%, based on the weight of the film forming constituents, gives satisfactory results, although in most cases approximately 5% or less will be found to be ample.

It is understood, of course, that I do not limit myself to the particular types of lacquers specifically referred to herein but may use calcium or other heavy metal tungate as an anti-sag agent in any of the ordinary types of brushing lacquers.

Now having described my invention, what I desire to claim is:

1. A brushing lacquer comprising a cellulose derivative base, a slow drying solvent therefor, and a heavy metal soap of tung oil acids in an amount to render the lacquer substantially non-sagging when applied in films of normal brushing thickness on vertical surfaces, the proportions of solvents and diluents being such as to produce a brushing lacquer.

2. A brushing lacquer comprising nitrocellulose, a slow drying solvent therefor, and a heavy metal soap of tung oil acids in an amount to render the lacquer substantially non-sagging when applied in films of normal brushing thickness on vertical surfaces, the proportions of solvents and diluents being such as to produce a brushing lacquer.

3. A brushing lacquer comprising nitrocellulose, a slow drying solvent therefor, and calcium tungate in an amount to render the lacquer substantially non-sagging when applied in films of normal brushing thickness on vertical surfaces, the proportions of solvents and diluents being such as to produce a brushing lacquer.

4. A brushing lacquer comprising nitrocellulose, a slow drying solvent therefor, and calcium tungate in an amount ranging from 2% to 7% on the weight of the film-forming constituents of said lacquer, the proportions of solvents and diluents being such as to produce a brushing lacquer.

5. A brushing lacquer comprising nitrocellulose, a slow drying solvent therefor, and calcium tungate to the amount of approximately 5% on the weight of the film-forming constituents of said lacquer, the proportions of solvents and diluents being such as to produce a brushing lacquer.

6. A brushing lacquer comprising nitrocellulose, resin, a slow drying solvent for said nitrocellulose and resin comprising approximately equal quantities of butyl lactate and petroleum naphtha, and calcium tungate in an amount ranging from 2% to 7% on the weight of the film-forming constituents of said lacquer, the proportions of solvents and diluents being such as to produce a brushing lacquer.

7. A brushing lacquer comprising a cellulose derivative base, a slow drying solvent therefor, a pigment, and a heavy metal soap of tung oil acids in an amount to render the lacquer substantially non-sagging when applied in films of normal brushing thickness on vertical surfaces, the proportions of solvents and diluents being such as to produce a brushing lacquer.

8. A brushing lacquer comprising nitrocellulose, a slow drying solvent therefor, a pigment, and a heavy metal soap of tung oil acids in an amount to render the lacquer substantially non-sagging when applied in films of normal brushing thickness on vertical surfaces, the proportions of solvents and diluents being such as to produce a brushing lacquer.

9. A brushing lacquer comprising nitrocellulose, a slow drying solvent therefor, a pigment, and calcium tungate in an amount to render the lacquer substantially non-sagging when applied in films of normal thickness on vertical surfaces, the proportions of solvents and diluents being such as to produce a brushing lacquer.

10. A brushing lacquer comprising nitrocellulose, a slow drying solvent therefor, a pigment, and calcium tungate in an amount ranging from 2% to 7% on the weight of the film-forming constituents of said lacquer, the proportions of solvents and diluents being such as to produce a brushing lacquer.

11. A brushing lacquer comprising nitrocellulose, a slow drying solvent therefor, a pigment, and calcium tungate to the amount of approximately 5% on the weight of the film-forming constituents of said lacquer, the proportions of solvents and diluents being such as to produce a brushing lacquer.

12. A brushing lacquer comprising nitrocellulose, resin, a slow drying solvent for said nitrocellulose and resin comprising approximately equal quantities of butyl lactate and petroleum naphtha, a pigment, and calcium tungate in an amount ranging from 2% to 7% on the weight of the film-forming constituents of said lacquer, the proportions of solvents and diluents being such as to produce a brushing lacquer.

GLENN H. PICKARD.